United States Patent
Ostrow et al.

(10) Patent No.: US 7,658,389 B2
(45) Date of Patent: *Feb. 9, 2010

(54) CHILD SAFETY SEAT DOLLY ASSEMBLY

(75) Inventors: Kenneth P. Ostrow, Los Gatos, CA (US); Kerry Williams, San Jose, CA (US)

(73) Assignee: Go-Go Babyz, Corp., San Jose, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 11/429,145

(22) Filed: May 5, 2006

(65) Prior Publication Data

US 2007/0257454 A1   Nov. 8, 2007

(51) Int. Cl.
*A61G 3/00* (2006.01)

(52) U.S. Cl. ............. 280/47.25; 280/47.27; 280/47.34; 280/47.38; 280/657

(58) Field of Classification Search ............. 280/47.37, 280/47.38, 47.26, 47.27, 47.41, 30, 37, 643, 280/644, 645, 655, 658, 47.25, 648; 24/192, 24/199

See application file for complete search history.

(56) References Cited

U.S. PATENT DOCUMENTS

| | | | | |
|---|---|---|---|---|
| 2,842,274 A * | 7/1958 | Sherman | .................. | 414/448 |
| 2,990,190 A | 6/1961 | Eriksen | | |
| 3,180,623 A * | 4/1965 | Huber | .................. | 24/68 CD |
| 3,210,033 A * | 10/1965 | Deardorf | .................. | 248/74.3 |
| 3,937,436 A * | 2/1976 | Stewart | .................. | 248/499 |
| 4,409,731 A * | 10/1983 | Campbell | .................. | 29/800 |
| 4,534,445 A * | 8/1985 | Fisher | .................. | 182/48 |
| 4,537,414 A | 8/1985 | Nusbaum | | |
| 4,623,204 A * | 11/1986 | Auclair | .................. | 439/100 |
| 4,762,331 A | 8/1988 | Tucker et al. | | |
| 5,104,134 A | 4/1992 | Cone | | |
| 5,281,761 A * | 1/1994 | Woo et al. | .................. | 174/78 |
| 5,372,405 A * | 12/1994 | Cash et al. | .................. | 297/383 |
| 5,383,585 A | 1/1995 | Weiss | | |
| 5,562,300 A * | 10/1996 | Nelson | .................. | 280/655.1 |
| 5,595,393 A | 1/1997 | Batten | | |
| 5,611,596 A | 3/1997 | Barley | | |
| 6,089,666 A | 7/2000 | Rosko | | |
| 6,357,063 B1 * | 3/2002 | Selby | .................. | 5/81.1 R |
| 6,367,821 B2 | 4/2002 | Thiele | | |

(Continued)

*Primary Examiner*—Paul N. Dickson
*Assistant Examiner*—George D. Spisich
(74) *Attorney, Agent, or Firm*—Womble Carlyle (57) ABSTRACT

An apparatus for transporting a child safety seat includes a wheeled assembly that may be clamped to the child safety seat. The wheeled assembly includes a plate member having a longitudinal axis on either side of which are formed one or more through holes. Clamping can be achieved by the use of threaded fasteners which pass through the through holes and are secured to a clamping mechanism that helps frictionally secure the plate member to the child safety seat. Suitable clamping mechanisms for this purpose may include a strap that passes through a passageway formed in the rear of the child safety seat, a clamping bracket having laterally extending arms that abut clampingly abut openings formed in the back of the child safety seat, and an structural elbow member integrally connected to the child safety seat against which a clamping force may be applied. The apparatus with attached child safety seat may be wheeled on the ground by a person using one hand. Furthermore, the apparatus is fully detachable from the child safety seat.

32 Claims, 10 Drawing Sheets

U.S. PATENT DOCUMENTS

| | | |
|---|---|---|
| 6,386,575 B1 | 5/2002 | Turner |
| 6,729,630 B2 * | 5/2004 | Szmidt et al. ............ 280/47.25 |
| 6,783,135 B1 | 8/2004 | Nord |
| 6,991,241 B1 | 1/2006 | Ostrow et al. |
| 7,165,775 B1 * | 1/2007 | Sellers ........................ 280/18 |
| 2002/0060444 A1 | 5/2002 | Cote |
| 2003/0192925 A1 * | 10/2003 | Boone ........................ 224/161 |
| 2003/0227149 A1 | 12/2003 | Budge |
| 2004/0075229 A1 | 4/2004 | Huntley |

* cited by examiner

CHILD SAFETY SEAT DOLLY ASSEMBLY

FIELD OF THE INVENTION

The present invention relates to transporting a child safety seat such as an infant car seat, child car seat, or a child booster seat. In particular, the invention relates to a two-wheeled dolly for transporting a child safety seat by wheeling it on the ground.

BACKGROUND OF THE INVENTION

The use of child safety seats for the safe restraint of infants and children in vehicles is well known. For the safety and comfort of an infant or child, and also to comply with applicable laws requiring the use of child safety seats for children of specified ages, child safety seats now are commonly removed from the family vehicle and taken along on travels. For example, a child's child safety seat may be used for the child in a rental car on the family vacation. In addition, child safety seats commonly may be used in other modes of transportation, such as airplanes, buses, boats, or trains, to provide a safer and more comfortable seat for young children.

Such use of child safety seats away from the family vehicle thus requires the transport of the child safety seats through airport terminals, bus stations, train stations, boat terminals, and the like. The typical infant or child safety seat is quite bulky, of an awkward shape, and may weigh between ten and twenty pounds. Thus the physical size, structure, and weight of the child safety seat make it difficult to carry and for most persons, require the use of both hands. This is particularly necessary if the child safety seat is carried for a substantial distance.

Various devices have been developed to assist with the transport of child safety seats, including a wide variety of bags, totes, and cases. Typically these travel bags comprise a zippered sack, with a handle and/or shoulder strap. The child safety seat may be placed in the sack and then carried from the family vehicle to baggage check, or onto the airplane, bus, etc.

Alternatively, some models of child safety seats are provided with wheels and a handle, essentially converting the child safety seat into a stroller so that it can be wheeled through an airport or other area. In addition, stroller-type attachments are made for child safety seats, again converting the child safety seat to a stroller-like apparatus that can be wheeled to its destination.

A child young enough to require the use of a child safety seat may also be too young to walk any considerable distance through an airport terminal, train station, etc. This generally requires that the child also be carried, typically in a stroller, a backpack or front carrier, or simply in the guardian's arms. In addition, travel with young children generally entails transporting various other equipment, such as diaper bags. As a result, persons transporting young children while traveling must potentially negotiate a number of large, awkward items, in addition to the child.

A prior solution in which the wheels and handle are separately formed and attached to a child safety seat is disclosed in U.S. Pat. No. 6,367,821. Solutions in which the wheels and handle are formed in one unit separable from the child safety seat are disclosed in U.S. Patent Publication No. 2003/0192925 A1, and U.S. Pat. Nos. 6,729,630 and 6,783,135.

Finally, commonly owned U.S. Pat. No. 6,991,241 shows a child safety seat dolly having a clamping bracket which secures the dolly to a child safety seat.

SUMMARY OF THE INVENTION

In one aspect, the present invention is directed to a child safety seat dolly in combination with a child safety seat. The child safety seat has a back side comprising a horizontally extending passageway. The child safety seat dolly comprises a plate member having a first side facing in a first direction and a second side facing in a second direction opposite to the first direction, the plate member having a longitudinal axis. A pair of wheels are rotatably mounted to the plate member and a handle member is attached to the plate member. At least one clamping strap passes through the horizontally extending passageway of the child safety seat, and clamps the child safety seat to the dolly.

In one variation of this first aspect of the invention, the plate member has spaced apart first and second through holes arranged on either side of the longitudinal axis. A first portion of the clamping strap protrudes through a first end of the passageway and is secured to the first through hole via a first threaded fastener. A second portion of the clamping strap protrudes through a second end of the passageway and is secured to the second through hole via a second threaded fastener. The first and second threaded fasteners are sufficiently tightened so as to frictionally clamp the plate member to the child safety seat.

In another variation of this first aspect of the invention, a ratchet is mounted on the plate member and the clamping strap has a first portion secured to the plate member, and a second, toothed portion engaging the ratchet. The clamping strap is sufficiently tightened by the ratchet so as to frictionally clamp the plate member to the child safety seat. The first portion of the clamping strap may be secured to a through hole formed in the plate member, via a threaded fastener.

In another aspect, the present invention is directed to a child safety seat dolly kit. The kit includes a plate member having a first side facing in a first direction and a second side facing in a second direction opposite to the first direction, the plate member having a longitudinal axis. A pair of wheels capable of being rotatably mounted on the plate member are also included in the kit, as is a handle member capable of being attached to the plate member. At least one clamping strap is also included.

In one version of the kit, the plate member further has spaced apart first and second through holes arranged on either side of the longitudinal axis. The clamping strap is capable of being attached at spaced apart first and second portions to the first and second through holes, respectively. A pair of threaded fasteners capable of attaching the first and second portions of the clamping strap, respectively, to said first and second through holes, respectively, are also included.

In another version of the kit, a ratchet capable of being mounted on the plate member is included. In addition, the clamping strap has a first portion capable of being secured to the plate member, and a second, toothed portion suitable for engaging the ratchet.

Either of the above versions of the kits may further include a clamping bracket capable of clamping abutment surfaces located on apertures formed in the back side of a child safety seat, and/or a pair of J-bolts suitable for hooking eye members formed on a back side of a child safety seat.

Still another version of the kit may include just the clamping bracket and a pair of threaded fasteners capable of attaching the clamping bracket to the plate member. Yet another version of the kit may just include a pair of J-bolts suitable for hooking an eye member formed on a back side of a child safety seat.

Kits with various combinations of the different clamping mechanisms are also possible.

In yet another aspect, the present invention is directed to child safety seat dolly in combination with a child safety seat having a back side provided with first and second projecting eye members. The child safety seat dolly comprises a plate member having a first side facing in a first direction and a second side facing in a second direction opposite to the first direction, the plate member having a longitudinal axis, the plate member further having a spaced apart first and second through holes arranged on either side of the longitudinal axis; a pair of wheels rotatably mounted to the plate member; and a handle member attached to the plate member. A first J-bolt passes through the first through hole and hooks the first projecting eye member while a second J-bolt passes through the second through hole and hooks the second projecting eye member. The first and second J-bolts are sufficiently tightened so as to frictionally clamp the plate member to the child safety seat.

In still another aspect, the present invention is directed to a child safety seat dolly in combination with a child safety seat having a back side comprising a pair of forwardly facing abutment surfaces. The child safety seat dolly comprises a plate member having a first side facing in a first direction and a second side facing in a second direction opposite to the first direction, the plate member having a longitudinal axis, the plate member further having a spaced apart first and second through holes arranged on either side of the longitudinal axis, the first through hole belongs to a first longitudinally extending row of through holes formed in the plate member, on one side of the longitudinal axis and the second through hole belongs to a second longitudinally extending row of through holes formed in the plate member, on an opposite side of the longitudinal axis. The dolly further comprises a pair of wheels rotatably mounted to the plate member and a handle member attached to the plate member. The dolly also includes a clamping bracket projecting in the first direction and secured to the plate member via one or more threaded fasteners. The clamping bracket has a pair of laterally extending arms that clampingly abut the forwardly facing abutment surfaces formed on the back side of the child safety seat. The one or more threaded fasteners are sufficiently tightened so as to frictionally clamp the plate member to the child safety seat.

In still another aspect, the present invention is directed to a child safety seat dolly assembly comprising a plate member having a first side facing in a first direction and a second side facing in a second direction opposite to the first direction, a pair of wheels rotatably mounted to the plate member, a handle member attached to the plate member, at least one clamping strap connected to the plate member, the at least one clamping strap being of sufficient length to pass through a seat belt passageway formed on a back side of a child safety seat, and a ratchet mounted on the plate member. The clamping strap may comprise a toothed portion suitable for engaging said ratchet.

BRIEF DESCRIPTION OF THE DRAWINGS

The present invention will now be described with respect to the following figures in which:

FIG. 5b shows a bottom perspective view of the cleat of FIG. 5a.

DETAILED DESCRIPTION OF THE INVENTION

Figure 1:
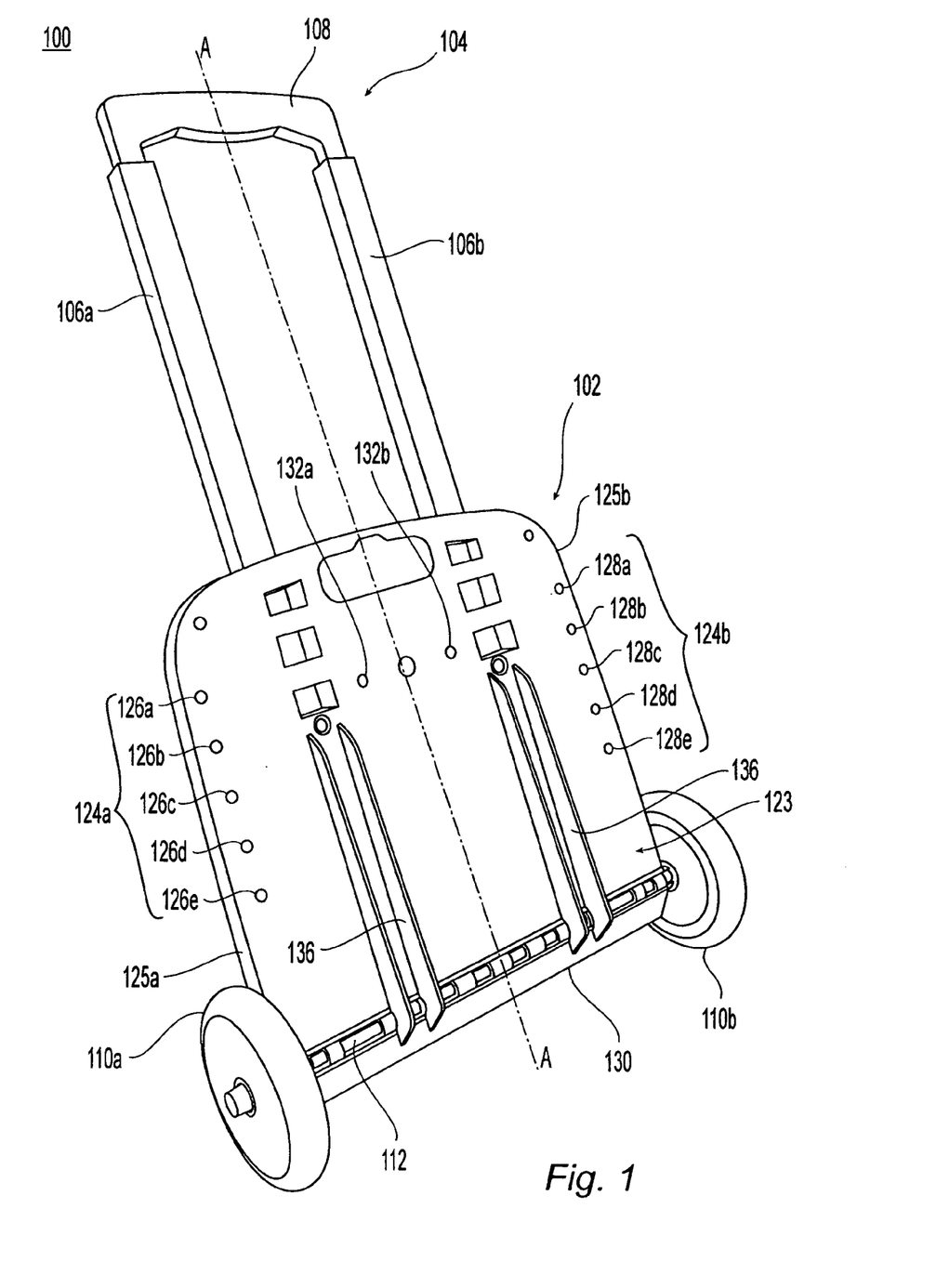
FIG. 1 shows a perspective rear view of a dolly in accordance with the present invention.

As seen in FIG. 1, a dolly 100 in accordance with the present invention includes a plate member 102 having a longitudinal axis A, which extends in a vertical direction in an assembled, upright dolly. The dolly 100 also includes a telescoping handle member 104 that is attached to the plate member 102. The handle member comprises a pair of legs 106a, 106b and a U-shaped telescoping handle 108 whose elongated members are slidingly received into the legs 106a, 106b. The dolly 100 also comprises a pair of wheels 110a, 110b rotatably mounted to the plate member 102 via an axle 112 which resides in an axle channel formed on the first side 122 of the plate member.

In one embodiment, the plate member 102 is formed by injection molding a resin or other suitable material, known to those skilled in the art of plastics and/or composites construction. The plate member 102 has a first side 122 facing in a first direction and a second side 123 facing in a second direction that is opposite to the first direction. The second side 123 of the plate member 102 may be provided with a plurality of longitudinally extending stiffening ribs 136. The ribs 136 provide strength and torsional rigidity, when the plate member 102 is clamped to a child safety seat.

On either side of the longitudinal axis A, the plate member 102 is provided with a longitudinally extending row 124a, 124b of through holes. In some embodiments, the first and second rows 124a, 124b of through holes are parallel to one another and are equidistant from the longitudinal axis A. As seen in the figures, the rows 124a 124b may be arranged along an adjacent vertical edge 125a, 125b of the plate member 102. The through holes in row 124a are designated by reference numerals 126a, 126b, 126c, 126d and 126e, while the through holes in row 124b are designated by reference numerals 128a, 128b, 128c, 128d and 128e. The through holes in one row have the same spacing as the through holes in the other row, and corresponding through holes in the two rows are at the same height relative to the bottom edge 130 of the plate member 102. Thus, for example through holes 126e and 128e are the same distance from bottom edge 130, through holes 126d, 128d are the same distance from bottom edge 130, etc.

The plate member 102 may also include a pair of spaced apart clamping bracket through holes 132a, 132b which are arranged on either side of the longitudinal axis A. The through holes 132a, 132b are spaced apart by a first distance D1, which corresponds to the spacing between openings 316a, 316b formed in a clamping bracket 300, described below with respect to FIGS. 8a and 8b.

Figure 2:
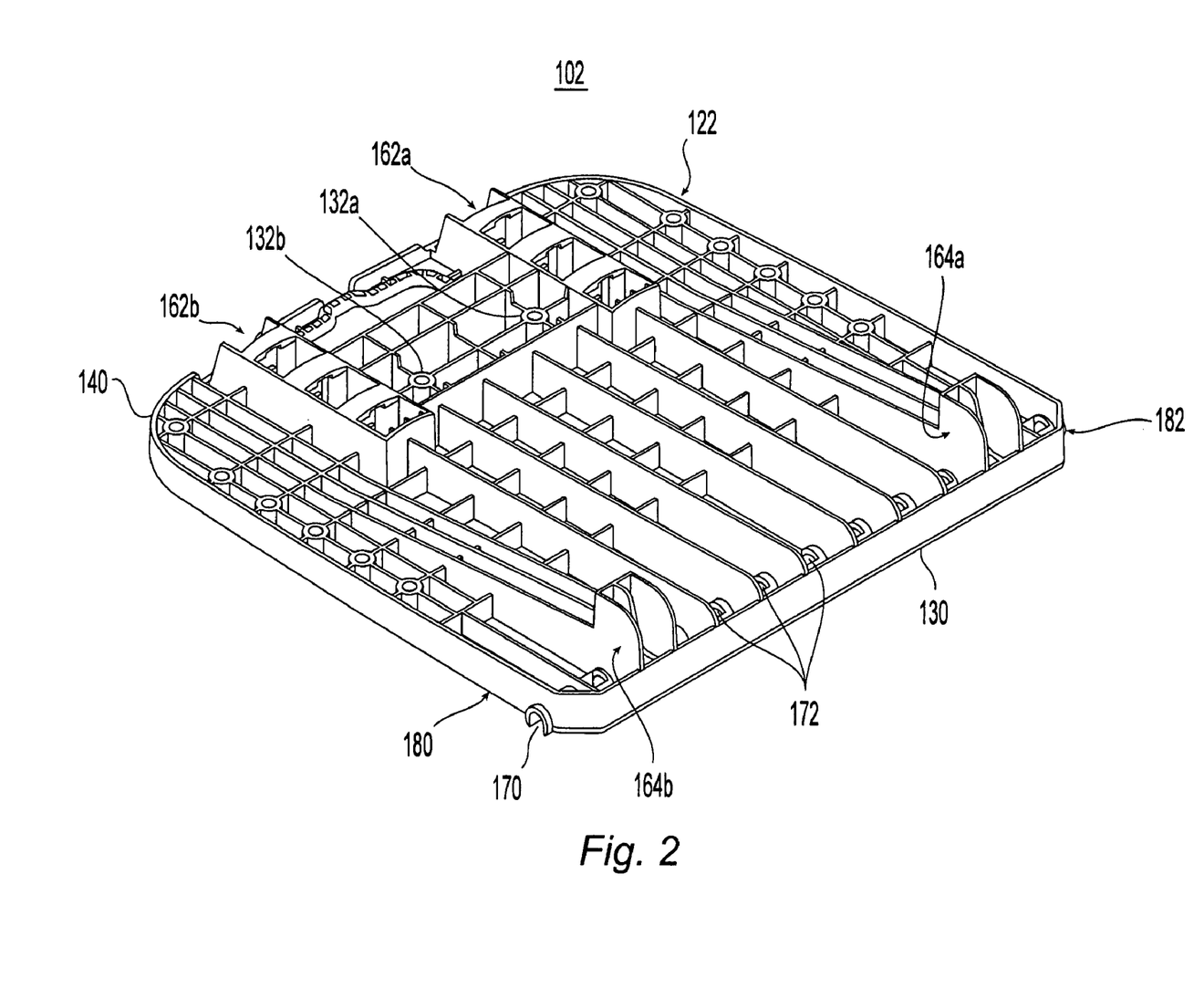
FIG. 2 shows the first side of the plate member of the dolly in FIG. 1.

FIG. 2 shows the first side 122 of the plate member 102. Extending from the top edge 140 of the plate member are a pair of parallel channels 162a, 162b configured to receive the legs 106a, 106b, respectively, of the handle member 104. The axle channel 170 formed proximate the bottom edge 130 extends between a first side edge 180 of the plate member 102 and a second, opposite side edge 182 of the plate member 102. As seen in FIG. 2, the axle channel has openings 172 throughout its length which communicate with the first side 122.

Also proximate the bottom edge 130 of plate member 102 are a pair of spaced apart positioning members 164a, 164b which protrude in the same first direction that the first side 122 faces. The positioning members 164a, 164b are shaped and sized to be received into complementary openings formed in the back sides of certain brands and models of child safety seats. The operation of the positioning members 164a, 164b is further described in aforementioned U.S. Pat. No. 6,991,241, whose contents are incorporated by reference to the extent necessary to understand the present invention.

Figure 3:
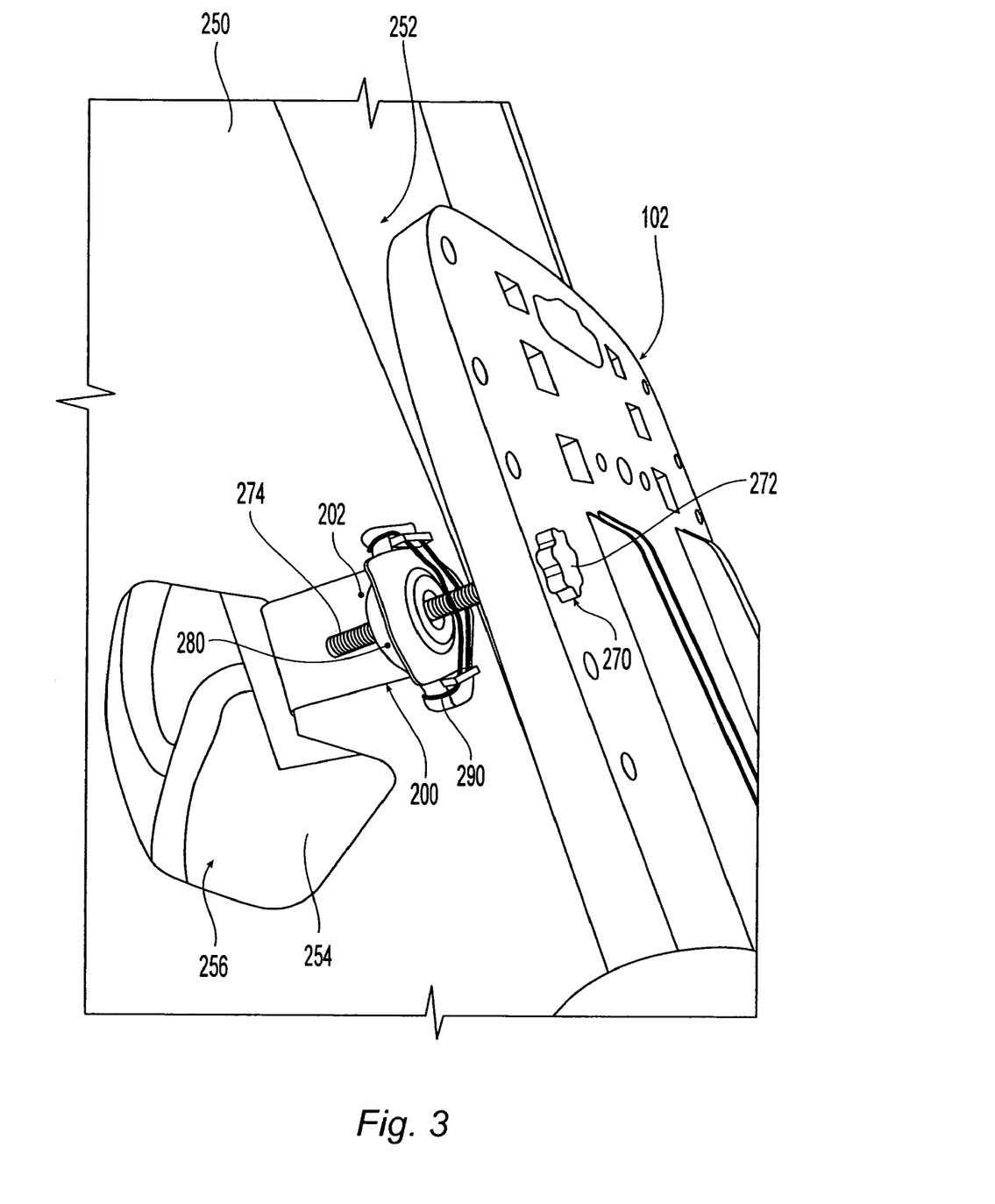
FIG. 3 shows the dolly of FIG. 1 secured to a first type of child safety seat using a clamping strap.

FIG. 3 shows a close-up of the plate member 102 of the dolly 100 in accordance with the present invention, in combination with a first type of child safety seat 250. The handle member 104 has been omitted in this figure for simplicity. The back side 252 of the child safety seat 250 has an aperture 254 which is part of a passageway 256. As is well-known to those skilled in the art, such a passageway 256 may be used to pass a seatbelt therethrough for securing the child safety seat 250 in a vehicle.

In the embodiment of FIG. 3, a clamping strap 200 passes through the passageway 256 and secures the dolly 100 to the child safety seat 250. A first portion 202 of the clamping strap 200 is secured to the plate member 102 via a threaded fastener 270. It is understood that another portion (not seen) of the clamping strap 200 is secured to a second such fastener (not shown) on the far side of the plate member 102. Both portions of the clamping strap 200 are provided with internal threads suitable for mating with the threaded fasteners.

In one embodiment, the threaded fastener 270 may be in the form of a thumb screw having an enlarged head 272 and a threaded stem 274. The thumb screw 270 passes through a through a through hole formed in the plate member 102, with its head 272 on the second side of the plate member. In addition, the thumb screw's threaded stem 276 threadingly passes through a cleat 280 secured to the clamping strap 200. The cleat 280 has the internal threads that cooperate with the threaded stem 274 to tighten the clamping strap 200 to the plate member 102. During use, the threaded fasteners 270 are sufficiently tightened so as to frictionally clamp the plate member 102, and thus the dolly 100, to the child safety seat 200.

Figures 4A, 4B:
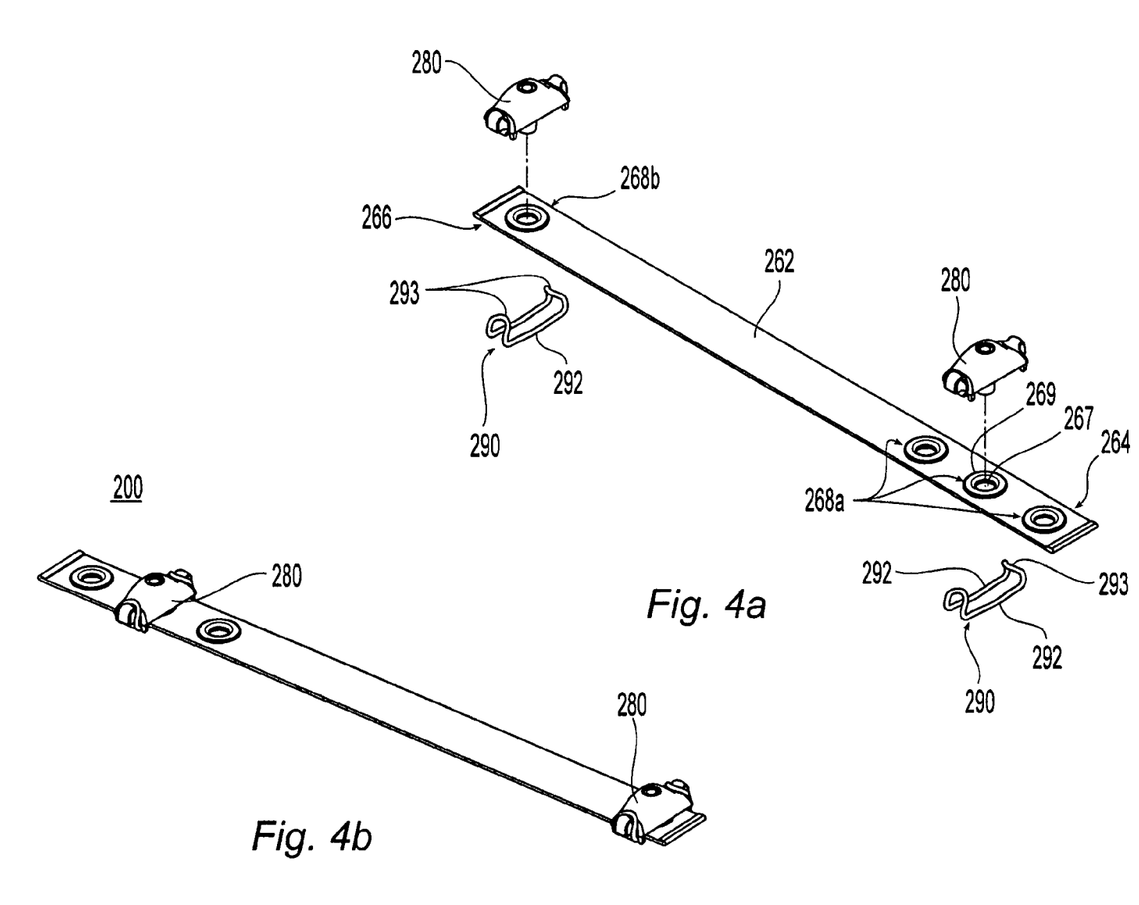
FIG. 4a shows an exploded view of a clamping strap and FIG. 4b shows an assembled strap.

FIGS. 4a and 4b show an exploded view and an assembled view, respectively, of the clamping strap 200. The clamping strap 200 comprises a strip 262 of nylon, plastic, other suitable flexible material having a first end 264 and a second end 266.

The first end 264 of the clamping strap 200 is provided with a plurality of spaced apart sites 268a at which a cleat 280 may be selectively accommodated. As seen in FIG. 4a, each site comprises an opening 267 formed through a thickness of the clamping strap 200, and a grommet 269 attached to the clamping strap 200 at the opening 267. The second end 266 of the clamping strap 200 is provided with another site 268b which can also accommodate a similar cleat 280.

By virtue of being able to select from among the different sites 268a at the first end 264 of the clamping strap 200, one is able to adjust the effective length of the clamping strap 200. This allows a single clamping strap to be used with passageways of different lengths, which may be provided on the back sides of different makes and models of child safety seats.

Each cleat 268 is secured to the clamping strap by a retainer clip 290. In one embodiment, each retainer clip 290 comprises a pair of elongated legs 292 connected at opposite ends by end loops 293. With reference FIGS. 4a, 5a & 5b, the legs 292 of the retainer clip 290 are received in spaced apart cutouts 293 which define a channel formed on the underside of the cleat 268. Meanwhile, the end loops of 293 the retainer clips 290 are hooked over shoulders 294 formed on the topside of the cleats 268 and come to rest in valleys 295.

Figure 5A:
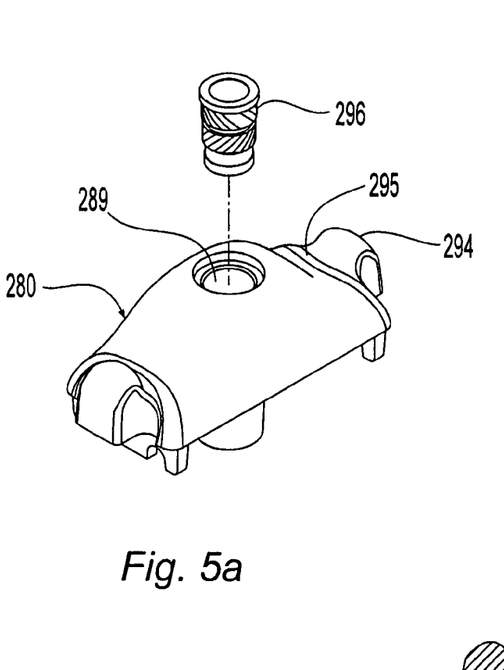
FIG. 5a shows an exploded top perspective view of a cleat and an internally threaded insert receivable into the cleat.
Figure 5B:
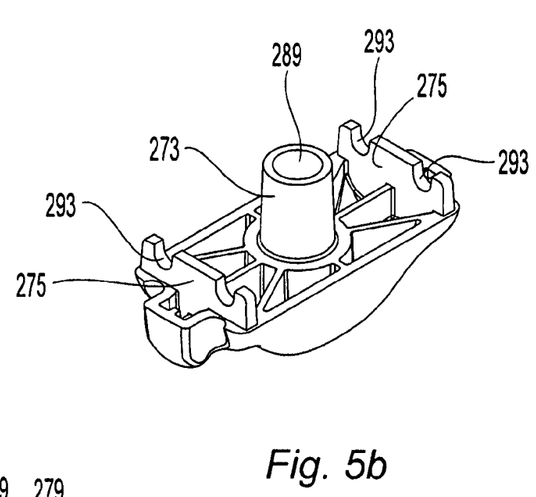
Figure 5C:
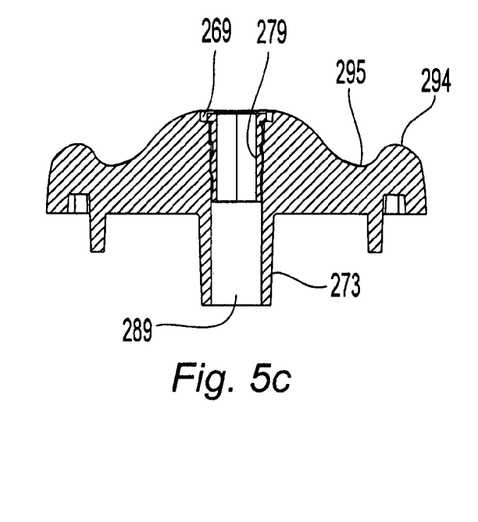
FIG. 5c shows a cross-section of the cleat of FIG. 5a with the internally threaded insert inside the cleat.

In the embodiment of FIGS. 5a, 5b and 5c, two cutouts 273 are formed on each of two spaced apart walls 275 formed on the underside of the cleat 268. The walls 275 are spaced apart by a distance sufficient to accommodate the width of the clamping strap 200. Furthermore, the cleat 268 has a central through hole 289 which extends through a cylindrical projection 273 formed on the underside of the cleat 268. When the cleat 268 is secured to the clamping strap 200, the cylindrical projection 273 occupies the opening 267 and the clamping strap 200 is received between the walls 275.

As seen in FIGS. 5a and 5c, an internally threaded insert 296 is received into the central through hole 289 of the cleat 268. In particular, as best seen in FIG. 5c, the internally threaded insert 296 is received via the topside of the cleat 268. The internally threaded insert 296 has internal threads 279. The internal threads 279 cooperate with the threaded fastener 270, when the threaded fastener 270 is being used to secure the first and second ends of the clamping strap 200 (which clamping strap passes through the passageway 256) to the plate member 102. Thus, in one embodiment, the internally threaded insert 296 mounted within the cleat 268, which in turn is secured to the clamping strap 200, provides the clamping strap 200 with threads for cooperating with the threaded fastener 270. In one embodiment, the internally threaded insert is a DODGE® Ultrasert IV-type flanged brass insert. Inserts of this type are known to those skilled in the art of providing plastic or composite components with wear-resistant internal threads.

Figure 6:
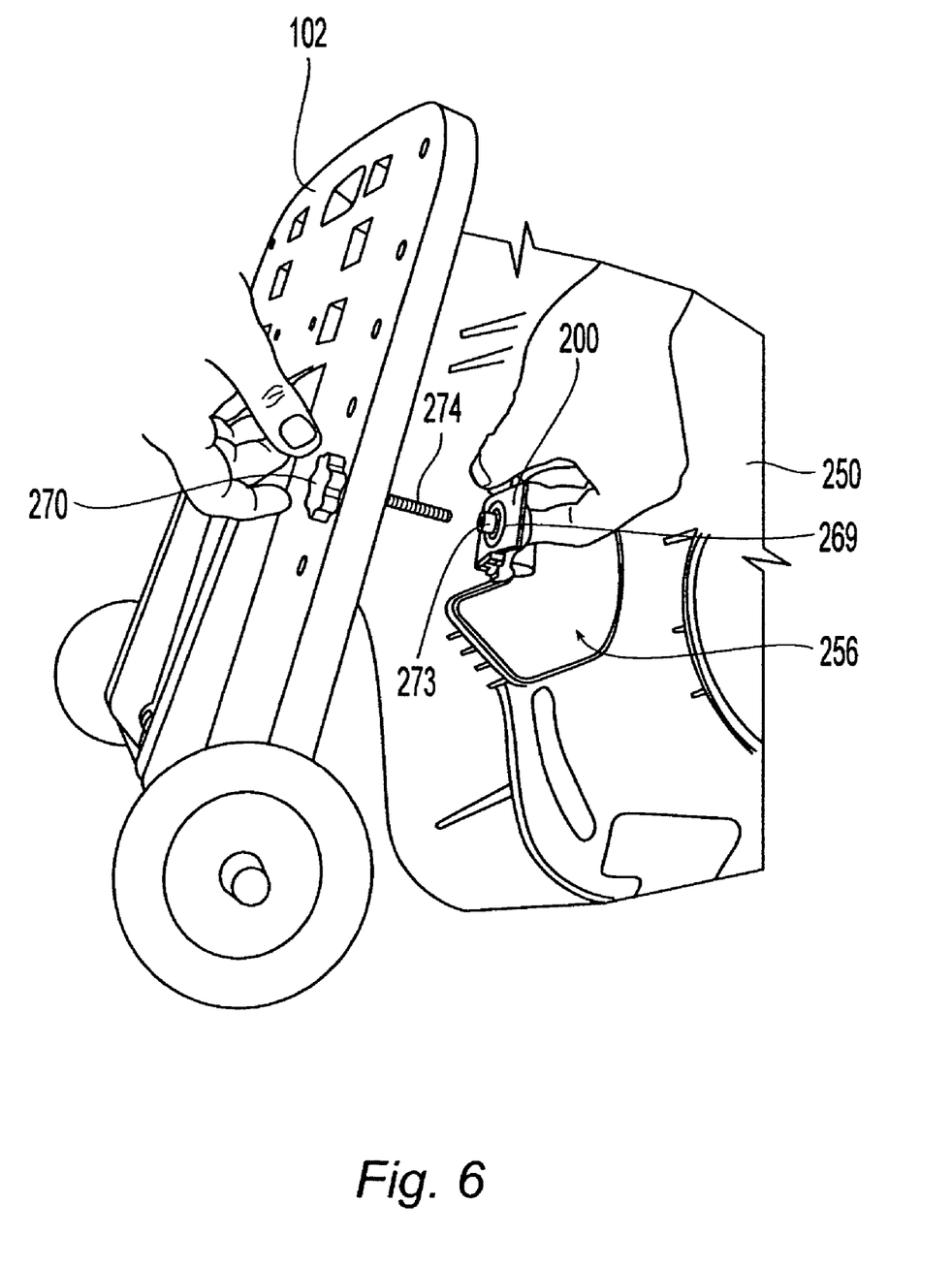
FIG. 6 shows a side view of the dolly and child care seat as the strap is being secured to the threaded fastener.

FIG. 6 illustrates an intermediate step in securing the plate member 102 to the clamping strap 200. The threaded stem 274 of the threaded bolt 270 is about to be received into the opening 289 formed in the projection 273, when the projection 273 protrudes through the grommet 269. It is understood from FIG. 6 and FIG. 5c that the threaded stem 274 is pushed into the opening 289 until it engages the internal threads 279 of the insert 296, at which point the operator may begin turned the threaded fastener 270 to tightened the clamping strap 200 and thereby frictionally secure the plate member 102, and thus the dolly 100 to child safety seat 250.

Figure 7:
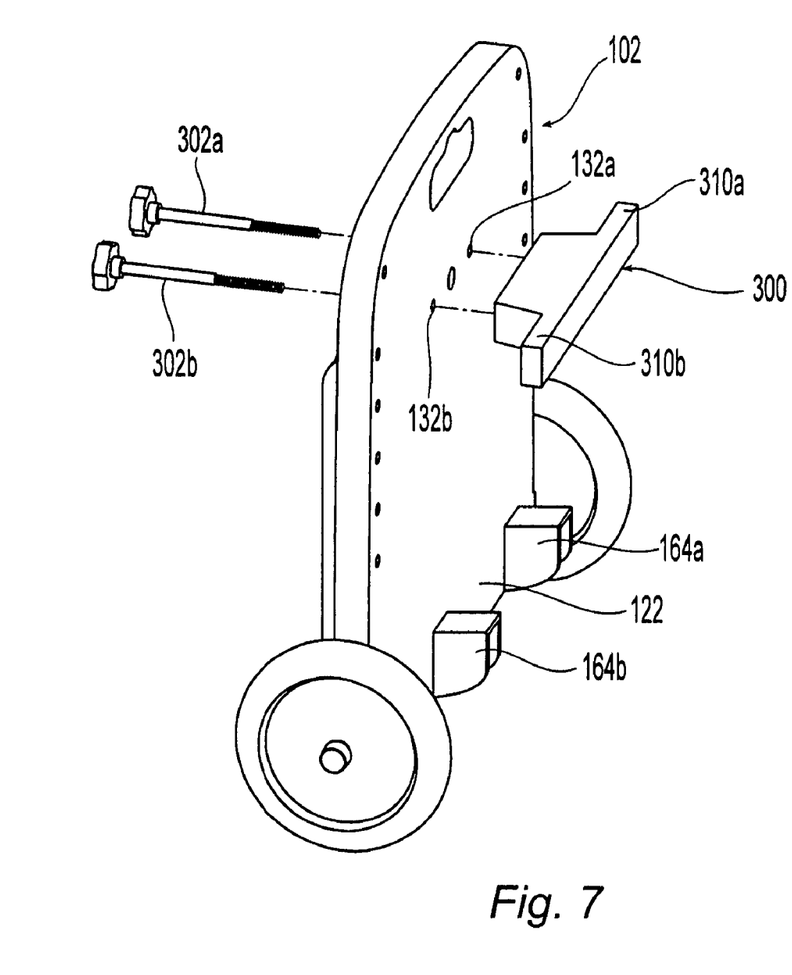
FIG. 7 shows a stylized view of the front of the plate member and a clamping bracket.

FIG. 7 shows a stylized view of the front 122 of the plate member 102 of the dolly 100 and a clamping bracket 300. The handle member 104 has been omitted in this figure for simplicity. A pair of threaded fasteners in the form of thumb screws 302a, 302b are used to secure the clamping bracket 300 to the plate member 102. The thumb screws 302a, 302b pass through clamping bracket through holes 132a, 132b from the backside 123 of the plate member and enter the used to fastening clamping bracket 300 is secured to the plate member 102 of the dolly 100.

As seen in this figure, the clamping bracket 300 projects in the same first direction as the positioning members 164a, 164b. The clamping bracket has a pair of laterally extending arms 310a, 310b, each arm having a rearwardly facing clamping surface 312a, 312b, respectively (see FIG. 8a).

The function of the clamping bracket 300 is for its rearwardly facing clamping surfaces 312a, 312b to abut forwardly facing abutment surfaces formed on apertures associated with a passageway found on the back side of a child safety seat. To accomplish this, the laterally extending arms 310a, 310b of the clamping bracket 300 are positioned to enter the apertures, and then the threaded fasteners 302a, 302b which pass through the clamping bracket 300 are turned to tighten the assembly. This causes the clamping surfaces 312a, 312b to abut the abutment surfaces of the apertures. Further tightening secures the plate member 102 of dolly 100 to the child safety seat, with the rearwardly facing clamping surfaces 312a, 312b of the clamping member applying a clamping force against the forwardly facing abutment surfaces formed on the apertures of the child safety seat. The clamping action of the clamping bracket 300 is further described in aforementioned U.S. Pat. No. 6,991,241, whose contents are incorporated by reference to the extent necessary to understand the present invention.

Figures 8A, 8B:
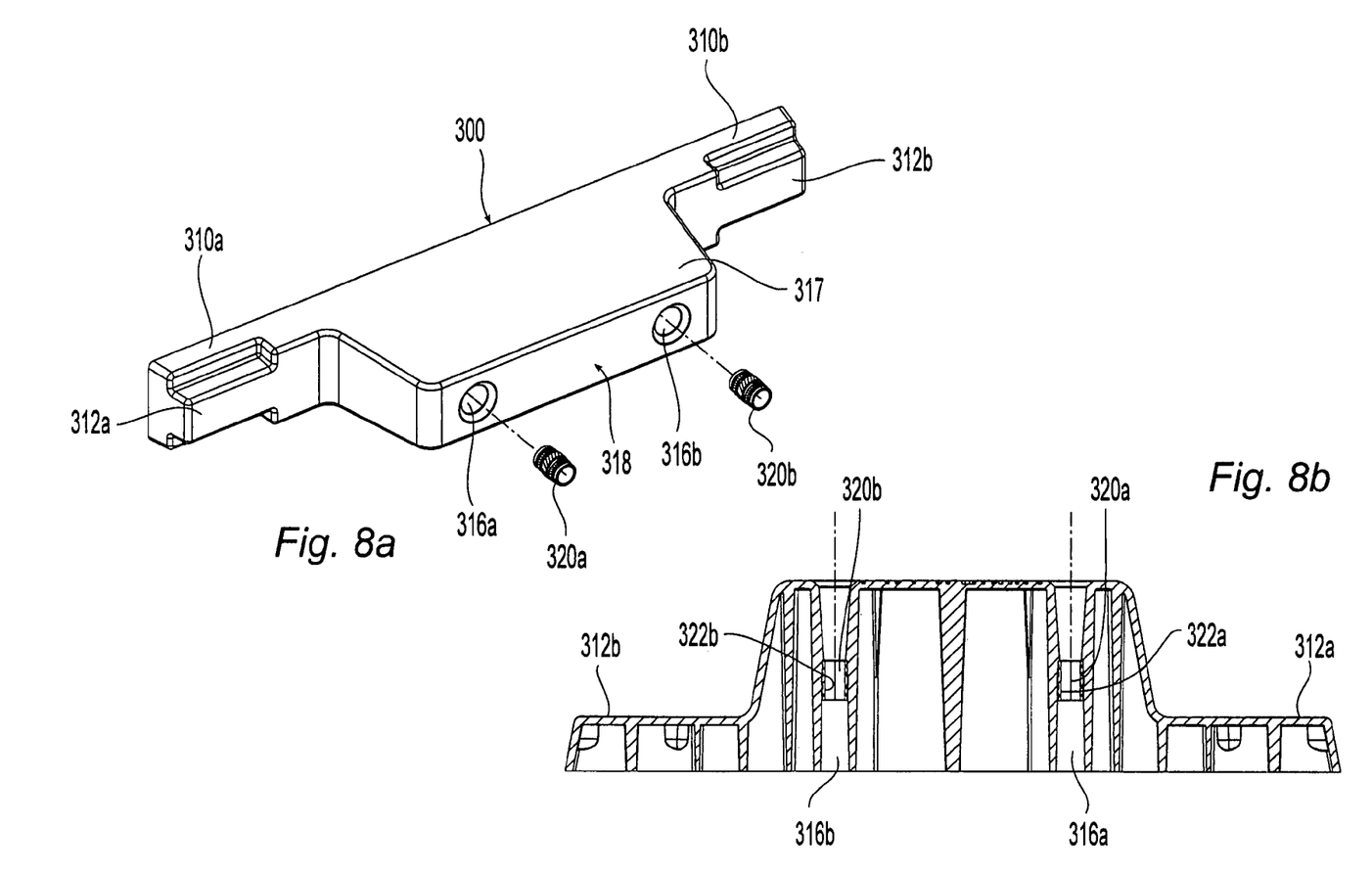
FIG. 8a shows an exploded view of the clamping bracket of FIG. 7 and a pair of internally threaded inserts that can be received into holes formed in the clamping bracket.
FIG. 8b shows a cross-section of a clamping bracket showing the internally threaded inserts.

As seen in FIGS. 8a and 8b, the clamping bracket 300 has a leg member 317 which terminates in an end surface 318. It is this end surface 318 of the leg member 317 that abuts against the first side 122 of the plate member 102, when the threaded fasteners 302a, 302b are inserted through the plate member 102 and into spaced apart through holes 316a, 316b formed in the end surface 318. Thus, the spaced apart through holes 316a, 316b can be aligned with the clamping bracket through holes 132a, 132b formed in the plate member 102, when it is desired to employ the clamping bracket 300 in conjunction with the dolly 100.

A pair of bidirectional internally threaded inserts 320a, 320b are positioned in a medial portion of the through holes 316a, 316b, respectively. Each of these inserts 320a, 320b has a corresponding internal thread 322a, 322b, respectively, for engaging the threaded fasteners 302a, 302b, respectively. In one embodiment, the internally threaded inserts 320a, 320b are a DODGE® Ultrasert III-type symmetrical brass insert. Inserts of this type are also known to those skilled in the art of providing plastic or composite components with wear-resistant internal threads.

Figure 9:
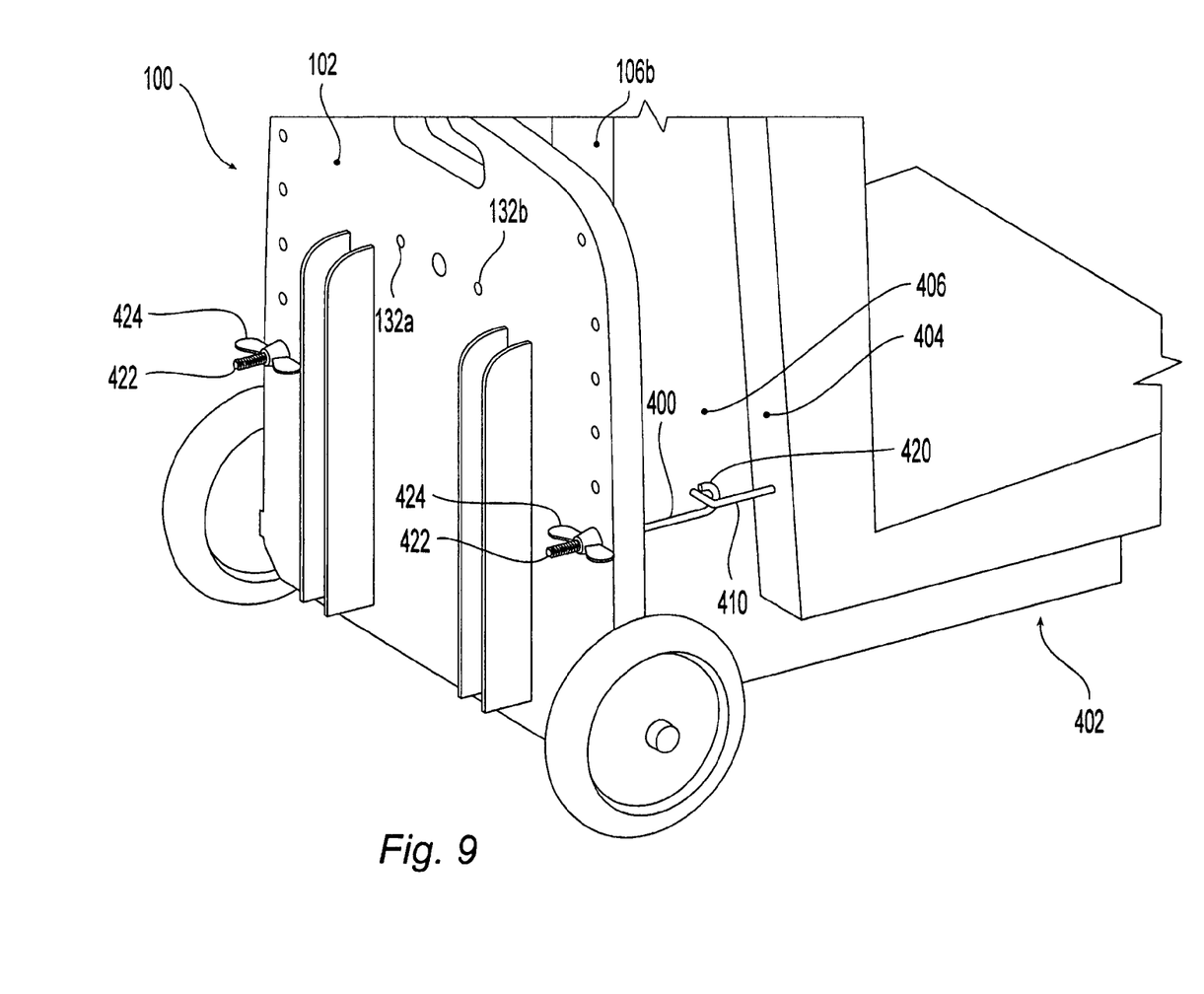
FIG. 9 shows the dolly of FIG. 1 secured to a second type of child safety seat using a hook-type threaded fastener.

FIG. 9 shows the dolly 100 clamped to the back side of another embodiment of a child safety seat, shown generally as 402. This child safety seat 402 includes a structure 410 that projects outwardly from the child safety seat 402. As seen in the figure, the structure 410 is an L-shaped eye 410 which connects a first portion 404 of the child safety seat 402 to a second portion 406 of the child safety seat. Depending on the child safety seat, the eye 410 may be formed of metal, plastic, composite material, or other substance. Although only one eye 410 is shown in this figure, it is understood that two such eyes 410, on either side, are provide on the child safety seat 402.

Hook-type threaded fasteners, in the form of J-bolts 400, are used to clampingly secure the dolly 100 to the child safety seat 402. The J-bolts 400 have a hook end 420 which hooks the eye 410, and a threaded end 422 which passes through a through hole in the plate member 102. It is understood that two such J-bolts are used, one for hooking each eye 410. In one embodiment, a wing nut 424 is used to secure the threaded end 422 of the J-bolts to plate member 102. As the wing nuts 424 are tightened, the hook ends 420 pull on the eyes 410, thereby clamping the child safety seat 402 to the plate member 102. The wing nuts 424 are used to tighten the first and second J-bolts sufficiently tight so as to frictionally clamp the plate member 102 to the child safety seat 402.

Figure 10:
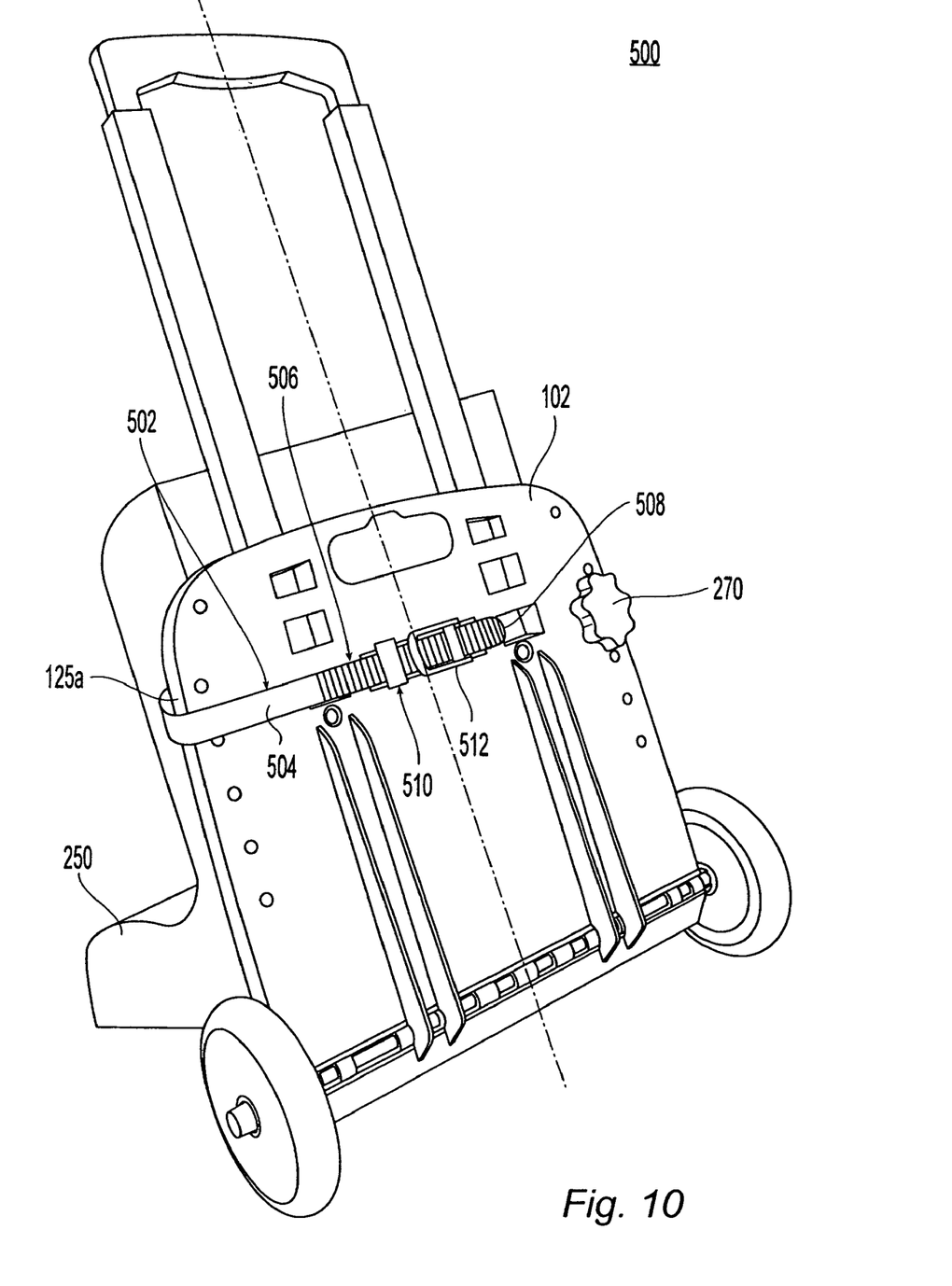
FIG. 10 shows the dolly of FIG. 1 secured to the first type of child safety seat using a clamping strap in conjunction with a ratchet.

FIG. 10 shows a combination 500 of a dolly clamped, via clamping strap 502, to a child safety seat 250 of the sort having a back side formed with a passageway (the passageway being hidden by the plate member 102 in FIG. 10). In this combination 500, a ratchet 510 is mounted on the plate member 102, such as at through holes 132a, 132b (see FIG. 1). A clamping strap 502 is of sufficient length to pass through the passageway, and has a first portion (first portion being hidden in FIG. 10) adapted to be attached to the plate member 102 and second, toothed portion 506 end suitable for engaging the ratchet 510.

In FIG. 10, the clamping strap passes through the passageway and a first portion of the clamping strap 502 is secured to the plate member 102. In the embodiment shown, the (hidden) first portion of the clamping strap 502 is secured to the plate member 102 via a threaded fastener 270, much as seen in FIG. 3. It is understood, however, that other techniques may be used to secure the first portion of the clamping strap 502 to the plate member 102.

An intermediate portion 504 of the clamping strap 502 emerges from an opposite end of the passageway, wraps around the first edge 125a of the plate member 102, and connects to a second, toothed portion 506. The ratchet 510 mounted on the second side of the plate member 102 cooperates with the toothed portion 506 of the clamping strap 502. When the toothed portion 506 of the clamping strap is engaged by the ratchet 510, operation of the ratchet handle 512 serves to tighten the clamping strap 502 and propel the latter's tongue 508 further towards the threaded fastener 270, seen in FIG. 10. People skilled in the art are familiar with the operation and use clamping straps having a toothed portion 506 suitable for engaging such ratchets 510.

While the embodiment of FIG. 10 shows the clamping strap 502 to wrap around the first edge 125a of the plate member, it is understood that in other embodiments, the plate member may have a vertically extending slot in place of, or adjacent to, the through holes proximate the first edge 125a of the plate member, and the clamping strap 502 may pass through such a slot.

The dolly 100 of the present invention may be sold as kit which a current owner of a child safety seat may wish to acquire. Such a kit will generally include a plate member, such as plate member 102, a handle member 104, wheels 106a, 106b and any hardware needed to mount the wheels, such as the axle 108. These items may be partially or fully dissembled, though in some embodiments these items may even completely be assembled.

The kit will also include at least one of the aforementioned clamping mechanisms to clamp a child safety seat to the dolly. Thus, there may be one type of kit that comes with the clamping strap 200 and its various accessories such as the cleats, spring clips, and threaded fasteners. Another type of kit may come with the clamping bracket 300 and threaded fasteners. Still another type of kit may come with just the J-bolts 400 and the nuts used to tighten the J-bolts. Still another type of kit may come with the ratchet 500 and the toothed clamping strap 504.

Since different child safety seats differ in their construction, such a kit may include the necessary hardware for more than just a single style of child safety seat. In some embodiments, the kit will include two, three or even all four types of clamping mechanisms, thereby allowing a single kit to function with a variety of different types of child care seats. It should be noted that in such kits, the same plate member 102 may thus be used with a plurality of different types of clamping mechanisms (clamping strap, clamping bracket and hook (e.g., J-bolt) and even ratchet) so as to accommodate a variety of child safety seats.

Also, a child safety seat dolly in accordance with the present invention can selectively be clamped to a child safety seat, for transporting the child safety seat with the child seated therein. Since it can be selectively clamped, the dolly does not require that the child safety seat be modified. This obviates the need to permanently change any existing components or permanently attach any new components, either of which may violate regulations an specifications governing such seats. Thus, a dolly in accordance with the present invention may be used in conjunction with prior art child safety seats having the necessary structures to mate with the provided clamping mechanisms.

Although the present invention has been described to a certain degree of particularity, it should be understood that various alterations and modifications could be made without departing from the scope of the invention as hereinafter claimed.

The invention claimed is:

1. A child safety seat dolly in combination with a child safety seat wherein:
   the child safety seat has a back side comprising a horizontally extending passageway;
   the child safety seat dolly comprises:
      a plate member having a first side facing in a first direction and a second side facing in a second direction opposite to the first direction, the plate member having a longitudinal axis, the plate member further having a spaced apart first and second through holes arranged on either side of the longitudinal axis;
      a pair of wheels rotatably mounted to the plate member; and
      a handle member attached to the plate member;
   at least one clamping strap passes through the horizontally extending passageway, a first portion of the clamping strap protrudes through a first end of the passageway and is secured to the first through hole via a first threaded fastener, and a second portion of the clamping strap protrudes through a second end of the passageway and is secured to the second through hole via a second threaded fastener, the first and second threaded fasteners being sufficiently tightened so as to frictionally clamp the plate member to the child safety seat.

2. The combination according to claim 1, wherein the first through hole belongs to a first longitudinally extending row of through holes formed in the plate member, and the second through hole belongs to a second longitudinally extending row of through holes formed in the plate member, the first and second rows of through holes being arranged on either side of said longitudinal axis.

3. The combination according to claim 1, wherein the first and second rows of through holes are parallel to one another and equidistant from the longitudinal axis.

4. The combination according to claim 1, wherein:
   the first portion of the clamping strap is provided with a first cleat having first internal threads suitable for mating with the first threaded fastener.

5. The combination according to claim 4, wherein:
   the first portion of the clamping strap is provided with a plurality of spaced apart sites, each site being suitable for accommodating the first cleat.

6. The combination according to claim 5, wherein:
   each site comprises an opening formed through a thickness of the clamping strap, and a grommet attached to the clamping strap at the opening.

7. The combination according to claim 4, wherein:
   the second portion of the clamping strap is provided with a second cleat having second internal threads suitable for mating with the second threaded fastener.

8. The combination according to claim 7, wherein:
   the first portion of the clamping strap is provided with a plurality of spaced apart sites, each site being suitable for accommodating the first cleat; and
   each site comprises an opening formed through a thickness of the clamping strap, and a grommet attached to the clamping strap at the opening.

9. The combination according to claim 4, wherein the cleat is secured to the clamping strap by a retainer clip.

10. The combination according to claim 1, wherein:
    the first portion of the clamping strap is provided with a first cleat having first internal threads suitable for mating with the first threaded fastener;
    the second portion of the clamping strap is provided with a second cleat having second internal threads suitable for mating with the second threaded fastener;
    the first and second threaded fasteners pass through respective first and second through holes of the plate member and engage the first and second internal threads, respectively.

11. The combination according to claim 10, wherein each cleat is secured to a corresponding clamping strap by a retainer clip.

12. The combination according to claim 1, wherein the plate member further comprises a pair of horizontally spaced apart positioning members projecting in the first direction.

13. A child safety seat dolly kit comprising:
    a plate member having a first side facing in a first direction and a second side facing in a second direction opposite to the first direction, the plate member having a longitudinal axis, the plate member further having a spaced apart first and second through holes arranged on either side of the longitudinal axis;
    a pair of wheels capable of being rotatably mounted on the plate member;
    a handle member capable of being attached to the plate member; and
    at least one clamping strap capable of being attached at spaced apart first and second portions to said first and second through holes, respectively; and
    first and second threaded fasteners capable of attaching the first and second portions of the clamping strap, respectively, to said first and second through holes, respectively.

14. The child safety seat dolly kit according to claim 13, wherein:
    the first through hole belongs to a first longitudinally extending row of through holes formed in the plate member, on one side of the longitudinal axis; and
    the second through hole belongs to a second longitudinally extending row of through holes formed in the plate member, on an opposite side of the longitudinal axis.

15. The child safety seat dolly kit according to claim 14, wherein:
    the first and second rows of through holes are parallel to one another and equidistant from the longitudinal axis.

16. The child safety seat dolly kit according to claim 13, further comprising:
a clamping bracket having a pair of through holes spaced apart by a first distance and a pair of laterally extending arms bearing clamping surfaces suitable for clamping against forwardly facing abutment surfaces formed on a back side of a child safety seat; and
wherein the plate member is provided with a pair of clamping bracket through holes spaced apart by said first distance.

17. The child safety seat dolly kit according to claim 13, further comprising a pair of J-bolts configured to hook a structural member formed on a back side of a child safety seat.

18. The child safety seat dolly kit according to claim 13, further comprising:
a ratchet configured to be mounted on the plate member; and
a strap having a toothed portion suitable for engaging the ratchet.

19. A child safety seat dolly kit comprising:
a plate member having a first side facing in a first direction and a second side facing in a second direction opposite to the first direction, the plate member having a longitudinal axis;
a pair of wheels capable of being rotatably mounted on the plate member;
a handle member capable of being attached to the plate member;
a ratchet capable of being mounted on the plate member; and
a clamping strap having a first portion capable of being secured to the plate member, and a second, toothed portion suitable for engaging the ratchet.

20. A child safety seat dolly in combination with a child safety seat wherein:
the child safety seat has a back side provided with first and second projecting eye members;
the child safety seat dolly comprises:
a plate member having a first side facing in a first direction and a second side facing in a second direction opposite to the first direction, the plate member having a longitudinal axis, the plate member further having a spaced apart first and second through holes arranged on either side of the longitudinal axis;
a pair of wheels rotatably mounted to the plate member; and
a handle member attached to the plate member;
a first J-bolt has a threaded stem portion that passes through the first through hole and a hook portion that hooks the first projecting eye member, a second J-bolt has a threaded stem portion that passes through the second through hole and a hook portion that hooks the second projecting eye member, the first and second J-bolts being sufficiently tightened so as to frictionally clamp the plate member to the child safety seat.

21. The combination according claim 20, wherein:
the first through hole belongs to a first longitudinally extending row of through holes formed in the plate member, on one side of the longitudinal axis; and
the second through hole belongs to a second longitudinally extending row of through holes formed in the plate member, on an opposite side of the longitudinal axis.

22. The combination according to claim 21, wherein:
the first and second rows of through holes are parallel to one another and equidistant from the longitudinal axis.

23. A child safety seat dolly in combination with a child safety seat wherein:
the child safety seat has a back side comprising a pair of forwardly facing abutment surfaces;
the child safety seat dolly comprises:
a plate member having a first side facing in a first direction and a second side facing in a second direction opposite to the first direction, the plate member having a longitudinal axis, the plate member further having a spaced apart first and second through holes arranged on either side of the longitudinal axis, the first through hole belongs to a first longitudinally extending row of through holes formed in the plate member, on one side of the longitudinal axis and the second through hole belongs to a second longitudinally extending row of through holes formed in the plate member, on an opposite side of the longitudinal axis;
a pair of wheels rotatably mounted to the plate member;
a handle member attached to the plate member; and
a clamping bracket projecting in said first direction and secured to the plate member via a pair of threaded fasteners;
the clamping bracket has a pair of laterally extending arms that clampingly abut the forwardly facing abutment surfaces formed on the back side of the child safety seat; and
the first and second threaded fasteners are sufficiently tightened so as to frictionally clamp the plate member to the child safety seat.

24. The combination according to claim 23, wherein:
the first and second rows of through holes are parallel to one another and equidistant from the longitudinal axis.

25. A child safety seat dolly in combination with a child safety seat wherein:
the child safety seat has a back side comprising a horizontally extending passageway;
the child safety seat dolly comprises:
a plate member having a first side facing in a first direction and a second side facing in a second direction opposite to the first direction;
a pair of wheels rotatably mounted to the plate member;
a handle member attached to the plate member; and
a ratchet mounted on the plate member; and
a clamping strap has a first portion secured to the plate member, and a second, toothed portion engaging the ratchet, the clamping strap passing through the horizontally extending passageway and being sufficiently tightened by the ratchet so as to frictionally clamp the plate member to the child safety seat.

26. The combination according to claim 25, wherein the first portion of the clamping strap is secured to a through hole formed in the plate member, via a threaded fastener.

27. A child safety seat dolly assembly comprising:
a plate member having a first side facing in a first direction and a second side facing in a second direction opposite to the first direction;
a pair of wheels rotatably mounted to the plate member;
a handle member attached to the plate member;
at least one clamping strap connected to the plate member, the at least one clamping strap being of sufficient length to pass through a seat belt passageway formed on a back side of a child safety seat; and
a ratchet mounted on the plate member; wherein:
the clamping strap comprises a toothed portion suitable for engaging said ratchet.

28. A child safety seat dolly in combination with a child safety seat wherein:
the child safety seat has a back side comprising a horizontally extending passageway;
the child safety seat dolly comprises:
a plate member having a first side facing in a first direction and a second side facing in a second direction opposite to the first direction, the plate member having a longitudinal axis, the plate member further having a spaced apart first and second through holes arranged on either side of the longitudinal axis;
a pair of wheels rotatably mounted to the plate member; and
a handle member attached to the plate member; and
at least one clamping strap passes through the horizontally extending passageway, a first portion of the clamping strap protrudes through a first end of the passageway and is secured to the first through hole, and a second portion of the clamping strap protrudes through a second end of the passageway and is secured to the second through hole, such that the clamping strap frictionally clamps the plate member to the child safety seat.

29. A child safety seat dolly kit comprising:
a plate member having a first side facing in a first direction and a second side facing in a second direction opposite to the first direction, the plate member having a longitudinal axis, the plate member further having a spaced apart first and second through holes arranged on either side of the longitudinal axis;
a pair of wheels capable of being rotatably mounted on the plate member;
a handle member capable of being attached to the plate member; and
at least one clamping strap capable of being attached at spaced apart first and second portions to said first and second through holes, respectively, the at least one clamping strap being of sufficient length to pass through a seat belt passageway formed on a back side of a child safety seat.

30. The child safety seat dolly kit according to claim 29, wherein:
the first through hole belongs to a first longitudinally extending row of through holes formed in the plate member, on one side of the longitudinal axis; and
the second through hole belongs to a second longitudinally extending row of through holes formed in the plate member, on an opposite side of the longitudinal axis.

31. The child safety seat dolly kit according to claim 30, wherein:
the first and second rows of through holes are parallel to one another and equidistant from the longitudinal axis.

32. A child safety seat dolly assembly comprising:
a plate member having a first side facing in a first direction and a second side facing in a second direction opposite to the first direction;
a pair of wheels rotatably mounted to the plate member;
a handle member attached to the plate member;
at least one clamping strap connected to the plate member, the at least one clamping strap being of sufficient length to pass through a seat belt passageway formed on a back side of a child safety seat; and
a ratchet configured to tighten the clamping strap; wherein:
the clamping strap comprises a toothed portion suitable for engaging said ratchet.

* * * * *